F. H. KAISER.
FILM ACTUATING MECHANISM FOR PICTURE MACHINES.
APPLICATION FILED DEC. 4, 1919.
1,427,602.
Patented Aug. 29, 1922.
2 SHEETS—SHEET 1.
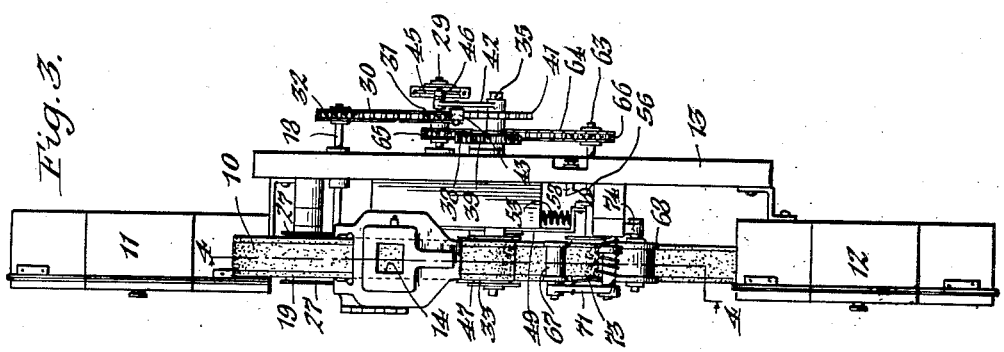
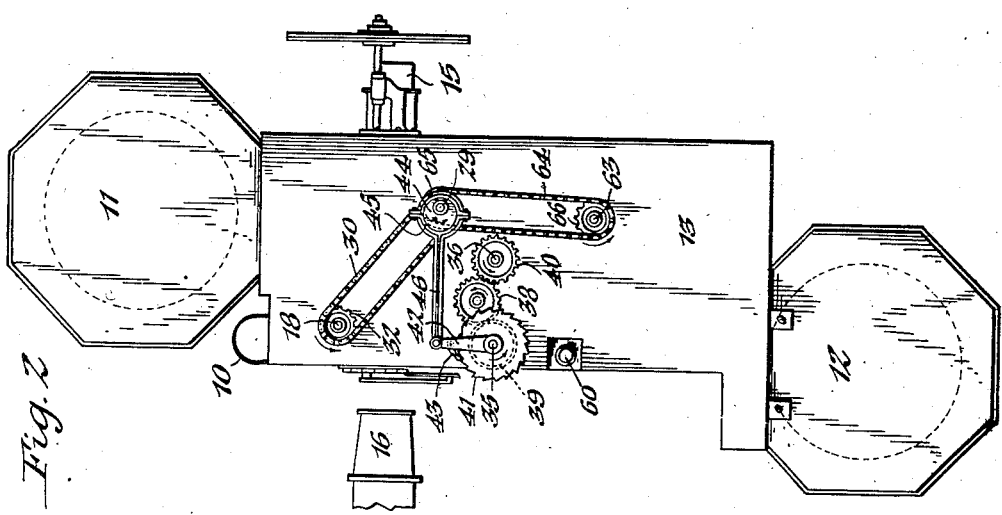
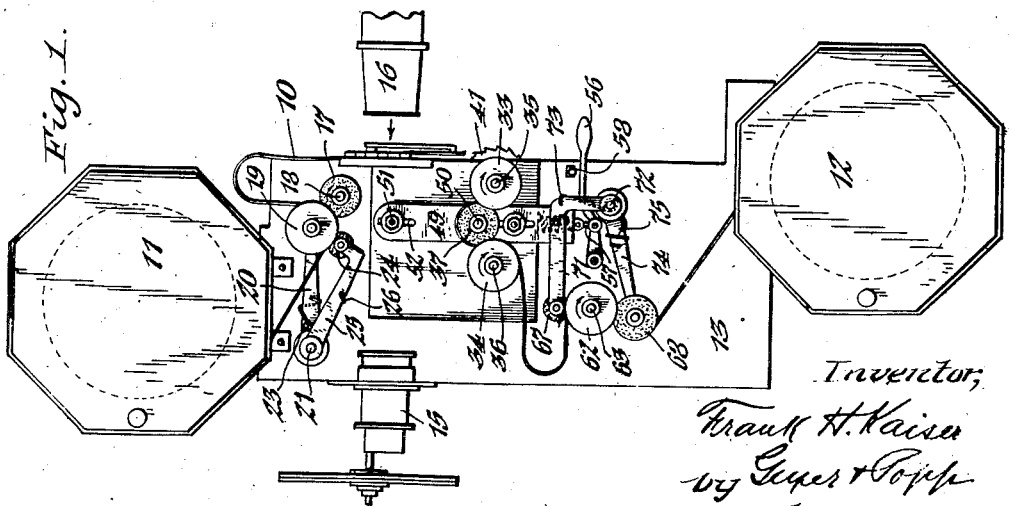
Inventor,
Frank H. Kaiser
by Guyer & Topff
Attorneys.

F. H. KAISER.
FILM ACTUATING MECHANISM FOR PICTURE MACHINES.
APPLICATION FILED DEC. 4, 1919.
1,427,602.
Patented Aug. 29, 1922.
2 SHEETS—SHEET 2.
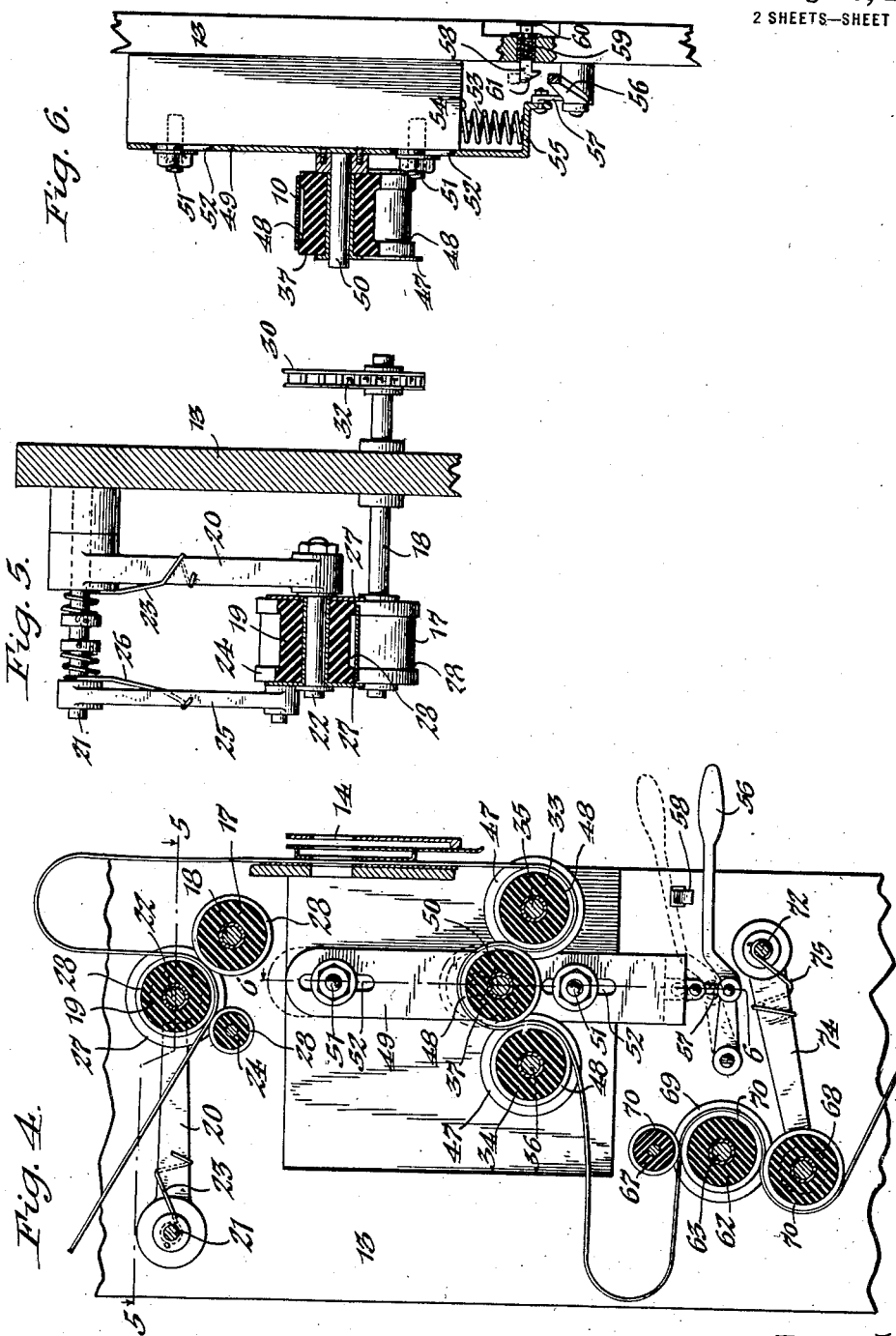

UNITED STATES PATENT OFFICE.

FRANK H. KAISER, OF BUFFALO, NEW YORK.

FILM-ACTUATING MECHANISM FOR PICTURE MACHINES.

1,427,602.	Specification of Letters Patent.	Patented Aug. 29, 1922.

Application filed December 4, 1919. Serial No. 342,418.

*To all whom it may concern:*

Be it known that I, FRANK H. KAISER, a citizen of the United States, residing at Buffalo, in the county of Erie and State of New York, have invented new and useful Improvements in Film-Actuating Mechanism for Picture Machines, of which the following is a specification.

This invention relates to mechanism for feeding a strip of picture film either in a camera which takes moving pictures or in a projector which reproduces the pictures on a screen.

In the machines heretofore in general use the film has usually been moved past the window or aperture of the machine by means of sprocket wheels which engaged their teeth with longitudinal rows of openings in the margin of the film which is objectionable because the openings in the strip soon wear and tear out requiring frequent repairs or shortening of the film as well as occasioning undesirable interruption in the reproduction of the picture and also involving undue loss of the picture by reason of the short life of the film.

It is one of the purposes of this invention to provide a mechanism for moving the film in a moving picture camera or projector which grips the same frictionally for propelling the same and thus avoid the objections above enumerated and to accomplish this purpose by means which are reliable in operation.

Another object of the invention is to provide means whereby the film will be fed without liability of marring or injuring the picture.

Further objects of this invention are to improve the film feeding mechanism in various details of construction as will presently more fully appear.

In the accompanying drawings: Figure 1 is a fragmentary side elevation of a moving picture projecting machine embodying my improvements and viewed from the left hand side thereof. Figure 2 is a similar view from the right hand side of the machine. Figure 3 is a rear elevation of the same. Figure 4 is a fragmentary vertical longitudinal section of the machine, on an enlarged scale, taken through the aperture and the adjacent parts of the film supplying, feeding and take-up mechanism. Figure 5 is a horizontal section taken on line 5—5, Fig. 4. Figure 6 is a vertical section taken on line 6—6, Fig. 4.

Similar characters of reference indicate corresponding parts throughout the several views.

10 represents the picture film which is made in the form of a strip but in the present instance the longitudinal margins of the same are not perforated but left intact so that the same is not weakened and not liable to be torn inasmuch as the present improved mechanism which feeds the film grips the same frictionally instead of interlocking therewith. This film is unwound from a supply reel enclosed in an upper magazine or housing 11 and rewound on a lower take-up reel enclosed in a lower magazine or housing 12 both of these magazines being mounted on a main frame 13 which may be of any suitable and approved construction. In its passage from the supply magazine to the take-up magazine the film moves past the window or aperture 14 of the picture machine at which point the positives of the film are successively projected on the screen by the usual optical system of which the light tube 16 in rear of the aperture and the lens tube 15 in front of the aperture form parts.

The mechanism embodying my invention for moving the film from the supply magazine past the aperture and to the take-up magazine is constructed as follows:

17 represents an upper main supply roller which forms part of the film supply mechanism and which is secured to a horizontal shaft 18 journaled transversely in a bearing on the upper part of the main frame. The film is pressed against the periphery of this roller by means of a main gripping roller 19 which is mounted on a spring pressed support consisting preferably of a vertically swinging arm 20 pivoted at its rear end by means of a pin 21 on the main frame while its front end is provided with a pin 22 on which the main gripping roller 19 turns, said arm being yieldingly turned in the direction for pressing the roller 19 against the roller 17 by means of a spring 23 wound around the pin 21 and connected at its opposite ends with the arm 20 and the pin 21, as shown in Figs. 1, 4 and 5. The film is pressed against the main gripping roller 19 of the film supplying device by an auxiliary gripping roller 24 which is pivoted on the front end of a rock arm 25, the latter being pivoted at its rear end on the pin 21 and yieldingly turned in the direction for pressing the roller 24 against the roller 19 by a spring 26 coiled around the pin 21 and connected at its opposite ends with the arm 25 and pin 21, as shown in Figs. 1 and 5. The film passes from the upper supply magazine downwardly and rearwardly between the main and auxiliary gripping rollers, thence upwardly between the main gripping roller 19 and the main supply roller 18, and thence downwardly past the aperture, forming an upwardly projecting loop between the film supply mechanism and the aperture. By thus wrapping the film around the main gripping roller and gripping the film between the latter and the main supply roller and auxiliary gripping roller in the manner indicated, a firm hold of the supply mechanism is obtained on the film whereby the latter is positively and reliably withdrawn from the supply reel and presented to the aperture. The main gripping roller is preferably provided with flanges 27 at its opposite ends which lap against opposite ends of the main supply roller and auxiliary gripping roller and thereby confine the film in engagement with the peripheries of those rollers. The peripheral surfaces of these rollers are preferably constructed of rubber or similar material so as to increase the grip of the same on the film and prevent any slippage but instead insure a steady supply of film. Each of the rollers of the supply mechanism is also provided on its periphery between its ends with an annular groove 28 which produces annular elevated surfaces on each of these rollers at opposite ends thereof which engage with the marginal parts of the film at opposite longitudinal edges thereof while the central part of each of these rollers has a receding or depressed surface which does not engage with the central longitudinal part of the film and therefore does not mar or wear the picture on this part of the film, as otherwise would be the case. By lifting the main gripping roller from the main supply roller and depressing the auxiliary gripping roller from the main gripping roller, it is possible to conveniently thread the film through the machine when getting the same ready. The main supply roller 17 is turned regularly and continuously and the main and auxiliary gripping rollers engaging therewith are similarly turned by imparting a regular and continuous rotary motion to the main supply roller 17. This may be accomplished in any suitable manner, for instance by the means which are shown in Figs. 2, 3 and 5, and which comprise a horizontal driving shaft 29 journaled transversely on the main frame and turned continuously and regularly from any suitable source and a chain belt 30 passing around sprocket wheels 31, 32 mounted respectively on the main driving shaft 29 and the shaft 18 which carries the roller 17.

In front of and below the aperture is arranged the feed mechanism for intermittently feeding the film past the aperture in accordance with my invention which feed mechanism is constructed as follows:

33, 34 represent two parallel horizontal main feed rollers which are arranged transversely in the machine one behind the other and secured to the shafts 35, 36 which are journaled in suitable bearings arranged on the adjacent part of the main frame so that the opposing sides of these rollers are spaced apart. 37 represents an intermediate gripping roller which is arranged parallel with the main feeding rollers and engages its opposite sides with the opposing sides of these main rollers, the axis of the intermediate roller being arranged on one side of a line drawn from the axis of one of these main rollers to the other, and the diameter of the intermediate roller being such that its periphery engages with the main rollers by a wedging or pinching action. The film passes from the aperture forwardly and upwardly around the underside of the rear main roller 33, thence forwardly and downwardly over the intermediate gripping roller 37 and thence downwardly and forwardly around the underside of the front main roller 34. The film is thus bent into serpentine form as it is wrapped around the main feeding and intermediate gripping rollers and a frictional hold is obtained on the same due to the wedge action of the intermediate roller 37 between the main rollers 33, 34, which operates to positively move the film forwardly without slippage when these rollers are turned forwardly. In order to present the film step by step to the aperture for exposing successive pictures therein at the aperture with an interval of rest, the main feeding rollers are moved forward intermittently and in unison. Although various means may be employed for accomplishing this purpose, those shown in the drawings merely illustrate one which may be employed and as there shown the same comprises an intermediate gear wheel 38 journaled on the main frame and meshing with gear wheels 39, 40 on the shafts 35, 36 of the main rollers 33, 34, a ratchet wheel 41 secured to one of the main roller shafts, for instance the shaft 35, a ratchet lever 42 mounted on the shaft 35 and provided with a pawl 43 engaging with the ratchet wheel, an eccentric 44 arranged on the driving shaft 29 and a strap 45 surrounding said eccentric and connected by a rod 46 with the ratchet lever. By this means a positive and reliable intermittent forward movement is imparted to the main feeding rollers from the main driving shaft which rotates regularly and continuously, and this intermittent movement is imparted to the film as it passes the aperture by reason of the frictional grip which is produced upon the film by the wedge action of the intermediate gripping roller relative to the two main feeding rollers as previously described.

In order to confine the film in its proper position on the peripheries of the main feeding and intermediate gripping rollers, these main rollers are provided with annular flanges 47 at their opposite ends which overlap opposite ends of the intermediate gripping roller and confine the film against lateral displacement. Each of the intermediate gripping and main feeding rollers has its periphery preferably constructed of rubber or similar material, so as to increase the gripping effect of the same on the film and prevent slippage. Each of these rollers is also provided on its periphery between its ends with an annular groove 48 whereby elevated faces are formed on the ends of each of these rollers which engage only with the longitudinal marginal parts of the film while the groove forms a receding face which does not engage the longitudinal central part of the film and thus avoids wearing that part of the film which bears the pictures and thus increases the life of the same.

The intermediate gripping roller 37 is so mounted that the same normally presses with its opposite sides against portions of the film which are supported on the opposing sides of the main feeding rollers. This pressure is preferably effected by resilient means which are constructed as follows:

49 represents a vertically movable carrier which supports the intermediate gripping roller 37 and which is movable toward and from a line connecting the axes of the main feeding rollers 33, 34, and at right angles to the path of the film. This carrier is preferably constructed in the form of a plate which is provided with a pin 50 on which the intermediate gripping roller is journaled and the same is guided in its movements by means which comprise two bolts 51 secured to the main frame and passing through longitudinal slots 52 in said carrier plate, as shown in Figs. 1, 4 and 6. This carrier plate is yieldingly held in its depressed position for pressing the intermediate gripping roller against the main feeding rollers and gripping the film between the same by means of a spring 53 which bears at its upper end against a shoulder 54 on the frame and at its lower end against a flange 55 on the carrier plate. When it is desired to thread the film between the main feeding rollers and the intermediate gripping roller, the carrier is lifted so as to clear the space between these rollers and render the same freely accessible. This lifting of the carrier is preferably effected by means of a lifting lever 56 which is pivoted to the main frame and connected by a link 57 with the carrier. For the purpose of holding the carrier in its elevated position and leaving both hands of the operator free for more easily threading the film past the main feeding and intermediate gripping rollers, a locking or detent device is provided which preferably comprises a catch 58 guided to move horizontally on the main frame and having its nose normally held in the path of the lifting lever by a spring 59 and a handle 60 for shifting this catch, so that its nose is retracted out of the path of this lever. The nose of the catch is preferably beveled, as shown at 61, so that upon raising the lifting lever the latter will deflect the nose of the catch out of the path of the lever by engaging this inclined or beveled face, and after this lever passes above the catch the latter will again be projected underneath this lever and hold the same in a raised position. When it is desired to again lower the carrier it is only necessary to withdraw the catch from underneath the lifting lever whereby the latter together with the carrier will be released and the intermediate gripping roller will be permitted to drop onto the main feeding rollers to resume feeding of the film.

After the film has been operated upon by the step-by-step feed mechanism, the same is engaged by a take-up mechanism which transfers the film to the take-up reel. This take-up mechanism in the preferred form shown in the drawings is constructed as follows:

62 represents a main take-up roller which is arranged below the intermittent feed mechanism and is rotated regularly and continuously in unison with the film supplying mechanism, so that the film is taken away from the intermittent feed mechanism in the same measure as the same is supplied thereto by the supplying mechanism. For this purpose the main take-up roller is mounted on the take-up driven shaft 63 which latter is journaled on the main frame and driven by a chain belt 64 passing around sprocket wheels 65, 66, arranged on the main driving shaft 29 and the driven shaft 63, respectively, as shown in Figs. 2 and 3. The upper side of this main take-up roller is engaged by an upper presser or gripping roller 67 while its lower side is engaged by a lower presser or gripping roller 68, these presser or gripping rollers being rotated by friction by the main take-up roller between the same. The film passes from the front main feeding roller forwardly and rearwardly in the form of a loop, thence between the main take-up roller and upper presser roller, thence downwardly around the rear side of the main take-up roller, thence forwardly between the main take-up roller and the lower presser or gripping roller, and thence downwardly around the front side of the lower presser roller and to the take-up reel. The film is confined on the rollers of the take-up mechanism by providing the main take-up roller with flanges 69 at its opposite ends which lap over the opposite ends of the companion upper and lower presser rollers and an increased frictional grip of these rollers on the film is produced for insuring positive feed of the film by constructing the faces of these rollers of rubber or similar material. On its central part each of the rollers of the take-up mechanism is provided with an annular groove 70 which produces elevated annular gripping surfaces at opposite ends of the same which engage with the longitudinal edges of the film for feeding the same while the central part of the same has a receding face which does not contact with the film and therefore does not produce any wearing effect on the longitudinal central part of the film which contains the pictures. The upper presser roller of the take-up mechanism is constantly pressed against the upper side of the main take-up roller by pivoting this upper roller on the rear end of an upper presser arm 71 which latter is pivoted at its rear end by a pin 72 on the main frame and yieldingly held in a depressed position by a spring 73 connected at one end to the upper presser arm and at its opposite end to the pin 72. The lower presser roller of the take-up mechanism is constantly pressed against the lower side of the main take-up roller by pivoting the same on the front end of a lower presser arm 74 which latter is pivotally mounted at its rear end on the pin 72 and yieldingly held in a depressed position by a spring 75 connected at one end with the lower presser arm and at its other end with the pin 72.

When it is desired to thread the film through the take-up mechanism, this can be readily done by raising the upper presser roller 67 and depressing the lower presser roller 68 away from the main take-up roller 62, thereby clearing the passages between these rollers for this purpose.

From the foregoing it will now be apparent that the film is advanced through the picture machine by frictional contact only with the film, so that the latter is not torn or injured and does not require perforations for this purpose, thereby permitting the film to be used a much greater length of time than is possible in the case of perforated films. This effects not only greater economy in the use of the film, but also insures greater returns and also avoids the expense, annoyance and delay incident to repairing a film when broken as frequently occurs in the case of perforated film which are engaged by toothed feeding wheels or rollers.

I claim as my invention:

1. A mechanism for feeding a picture film comprising two main toothless feed rollers the opposing sides of which are spaced apart, an intermediate toothless gripping roller which has its axis offset from a line connecting the axes of said main rollers and has its opposite sides facing the opposing sides of the main rollers, means for yieldingly pressing said intermediate roller between said main feed rollers, said film being gripped between the opposite peripheral portions of said intermediate roller and the opposing sides of said main rollers, the gap between the main feed rollers being less than the diameter of said intermediate rollers.

2. A mechanism for feeding a picture film comprising two main toothless feed rollers the opposing sides of which are spaced apart, an intermediate toothless gripping roller which has its axis offset from a line connecting the axes of said main rollers and has its opposite sides facing the opposing sides of the main rollers, means for yieldingly pressing said intermediate roller between said main feed rollers, said film being gripped between the opposite peripheral portions of said intermediate roller and the opposing sides of said main rollers and passing alternately in opposite directions around said intermediate roller and said main rollers, the gap between the main feed rollers being less than the diameter of said intermediate roller.

3. A mechanism for feeding a picture film comprising two main toothless feed rollers the opposing sides of which are spaced apart, an intermediate toothless gripping roller which has its axis offset from a line connecting the axes of said main rollers and has its opposite sides facing the opposing sides of the main rollers, means for yieldingly pressing said intermediate roller between said main feed rollers, said film being gripped between the opposite peripheral portions of said intermediate roller and the opposing sides of said main rollers by a wedging action so that the film is pinched between the opposing parts of the peripheries of said intermediate and main rollers, the gap between the main feed rollers being less than the diameter of said intermediate roller.

4. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, and means for yieldingly moving said main and intermediate rollers bodily laterally relatively to each other, the gap between the main feed rollers being less than the diameter of said intermediate roller.

5. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, fixed bearings in which said main rollers are journaled, a movable bearing on which said intermediate roller is journaled, and means for yieldingly moving said movable bearing toward a line connecting the axes of said main rollers, the gap between the main feed rollers being less than the diameter of said intermediate roller.

6. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, fixed bearings in which said main rollers are journaled, a movable bearing on which said intermediate roller is journaled, a carrier on which the bearing of said intermediate roller is mounted, a fixed support on which said carrier is guided in a direction crosswise of a line connecting the axes of said intermediate rollers, and a spring operating to move said carrier toward said line, the gap between the main feed rollers being less than the diameter of said intermediate roller.

7. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, fixed bearings in which said main rollers are journaled, a movable bearing on which said intermediate roller is journaled, means for yieldingly moving said movable bearing toward a line connecting the axes of said main rollers, and manually operable means for moving said intermediate roller in a direction away from said line, the gap between the main feed rollers being less than the diameter of said intermediate roller.

8. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, fixed bearings in which said main rollers are journaled, a movable bearing on which said intermediate roller is journaled, means for yieldingly moving said movable bearing toward a line connecting the axes of said main rollers, manually operable means for moving said intermediate roller in a direction away from said line, and means for locking said intermediate roller in a position out of operative relation to said main rollers, the gap between the main feed rollers being less than the diameter of said intermediate roller.

9. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, fixed bearings in which said main rollers are journaled, a movable bearing on which said intermediate roller is journaled, a carrier on which the bearing of said intermediate roller is mounted, a fixed support on which said carrier is guided in a direction crosswise of a line connecting the axes of said intermediate rollers, a spring operating to move said carrier toward said line, a hand lever connected with said carrier, and a catch for locking said lever in a position in which the intermediate roller is out of operative engagement with said main rollers, the gap between the main feed rollers being less than the diameter of said intermediate roller.

10. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, means for moving said main rollers and intermediate roller laterally relatively to each other, and means for driving said main rollers in unison, the gap between the main feed rollers being less than the diameter of said intermediate roller.

11. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, means for moving said main rollers and intermediate roller laterally relatively to each other, and means for driving said main rollers in unison comprising main gear wheels connected with said main rollers and an intermediate gear wheel meshing with both of said main gear wheels, the gap between the main feed rollers being less than the diameter of said intermediate roller.

12. A mechanism for feeding a picture film comprising two main toothless feed rollers which are spaced apart, an intermediate toothless gripping roller arranged between said main rollers and on one side of a line connecting the axes of said main rollers, said film passing alternately in opposite directions around said rollers and being gripped between the opposing peripheral parts of said main and intermediate rollers, means for moving said main rollers and intermediate roller laterally relatively to each other, and means for driving said main rollers in unison comprising main gear wheels connected with said main rollers and an intermediate gear wheel meshing with both of said main gear wheels, said intermediate roller being driven by frictional engagement with said main rollers, the gap between the main feed rollers being less than the diameter of said intermediate roller.

13. A mechanism for feeding a picture film comprising a feed roller adapted to engage with one side of said film, a main gripping roller adapted to engage with the opposite side of said film, a spring pressed support on which said main gripping roller is mounted, an auxiliary gripping roller adapted to press said film against said main gripping roller, and a spring pressed support for said auxiliary gripping roller.

14. A mechanism for feeding a picture film comprising an intermittent strip feeding device which includes two main toothless feed rollers adapted to engage with one side of said film, and a toothless gripping roller adapted to engage with a yielding pressure against the opposite side of said film between said main rollers, supplying means for supplying said film continuously to said intermittent feeding device, and take-up means for carrying said film continuously away from said intermittent feeding device, the gap between the main feed rollers being less than the diameter of said intermediate roller.

15. A mechanism for feeding a picture film comprising a film feeding device having two main feeding rollers, a gripping roller engaging with both feeding rollers and gearing connecting the main feed rollers, supplying means for supplying the film to said feeding device and having a plurality of cooperating rollers, a take-up device which carries the film away from said feeding device and which comprises a plurality of cooperating rollers, a driving device, and means for transmitting regular and continuous motion from said driving device to said supplying and take-up means and intermittent motion to said film feeding device.

FRANK H. KAISER.